(12) United States Patent
Vaccaro et al.

(10) Patent No.: US 12,288,107 B2
(45) Date of Patent: *Apr. 29, 2025

(54) DELAYED PROCESSING FOR ELECTRONIC DATA MESSAGES IN A DISTRIBUTED COMPUTER SYSTEM

(71) Applicant: NASDAQ, INC., New York, NY (US)

(72) Inventors: John Vaccaro, New York, NY (US); Charles Mack, Madison, NJ (US); Andrey Tsiporukha, Brooklyn, NY (US); Tal Cohen, Melville, NY (US); Andrew Oppenheimer, New York, NY (US); Kyle Prem, Hartsdale, NY (US)

(73) Assignee: NASDAQ, INC., New York, NY (US)

( * ) Notice: Subject to any disclaimer, the term of this patent is extended or adjusted under 35 U.S.C. 154(b) by 538 days.

This patent is subject to a terminal disclaimer.

(21) Appl. No.: 17/662,980

(22) Filed: May 11, 2022

(65) Prior Publication Data

US 2022/0269550 A1  Aug. 25, 2022

Related U.S. Application Data

(63) Continuation of application No. 16/746,600, filed on Jan. 17, 2020, now Pat. No. 11,354,178, which is a
(Continued)

(51) Int. Cl.
*G06F 9/54* (2006.01)
*G06F 16/901* (2019.01)
(Continued)

(52) U.S. Cl.
CPC .......... *G06F 9/546* (2013.01); *G06F 16/9024* (2019.01); *G06Q 40/04* (2013.01);
(Continued)

(58) Field of Classification Search
None
See application file for complete search history.

(56) References Cited

U.S. PATENT DOCUMENTS 9,996,879 B2    6/2018  Djurdjevic et al.
10,049,404 B2   8/2018  Weiss et al.
(Continued)

OTHER PUBLICATIONS

Extended European Search Report for Application No. EP18835905.3, 12 pages, dated Nov. 20, 2020.
(Continued)

*Primary Examiner* — Charles E Anya
(74) *Attorney, Agent, or Firm* — Nixon & Vanderhye P.C.

(57) ABSTRACT

A distributed computer system is provided. The distributed computer system includes at least one sequencer computing node and at least one matcher computing node. Electronic data messages are sequenced by the sequencer and sent to at least matcher computing node. The matcher computing node receives the electronic data messages and a reference value from an external computing source. New electronic data messages are put into a pending list before they can be acted upon by the matcher. A timer is started based on a comparison of the reference value (or a calculation based thereon) to at least one attribute or value of a new electronic data message. When the timer expires, the electronic data message is moved from the pending list to another list—where it is eligible to be matched against other, contra-side electronic data messages.

20 Claims, 9 Drawing Sheets

Related U.S. Application Data continuation of application No. 15/997,232, filed on Jun. 4, 2018, now Pat. No. 10,585,729.

(60) Provisional application No. 62/534,050, filed on Jul. 18, 2017.

(51) Int. Cl.
  *G06Q 40/04* (2012.01)
  *H04L 49/901* (2022.01)
  *H04L 67/1029* (2022.01)

(52) U.S. Cl.
  CPC ........ *H04L 49/901* (2013.01); *H04L 67/1029* (2013.01); *G06F 2209/547* (2013.01); *G06F 2209/548* (2013.01)

(56) References Cited

U.S. PATENT DOCUMENTS

| | | | |
|---|---|---|---|
| 10,127,615 | B1 | 11/2018 | Givot |
| 2006/0015441 | A1* | 1/2006 | Burkhardt ............ G06Q 40/04 705/37 |
| 2008/0021994 | A1 | 1/2008 | Grelewicz et al. |
| 2010/0312716 | A1* | 12/2010 | Lane ................ G06Q 40/06 705/37 |
| 2011/0320335 | A1* | 12/2011 | Gorelik ............. G06Q 40/04 705/37 |
| 2012/0123925 | A1 | 5/2012 | Daley et al. |
| 2013/0204759 | A1* | 8/2013 | Lutnick .............. G06Q 40/04 705/37 |
| 2014/0095371 | A1 | 4/2014 | Galinov et al. |
| 2014/0279348 | A1* | 9/2014 | Petersen ............. G06Q 40/04 705/37 |
| 2015/0066727 | A1 | 3/2015 | Wepsic et al. |
| 2015/0073967 | A1 | 3/2015 | Katsuyama et al. |
| 2015/0081512 | A1 | 3/2015 | Crutchfield et al. |
| 2015/0302441 | A1 | 10/2015 | Katsuyama et al. |
| 2015/0310549 | A1 | 10/2015 | Alderucci et al. |
| 2015/0341422 | A1 | 11/2015 | Färnlöf et al. |
| 2015/0356679 | A1 | 12/2015 | Schmitt |
| 2016/0055581 | A1 | 2/2016 | Katsuyama et al. |
| 2016/0283599 | A1* | 9/2016 | Zonabend ............ G06Q 10/087 |
| 2017/0004563 | A1 | 1/2017 | Noviello et al. |
| 2017/0046783 | A1 | 2/2017 | Hosman et al. |
| 2017/0103460 | A1 | 4/2017 | Golubovsky et al. |
| 2017/0124649 | A1* | 5/2017 | Schonberg ............ G06Q 40/04 |
| 2018/0276751 | A1 | 9/2018 | Kavanagh et al. |
| 2019/0005582 | A1 | 1/2019 | Kapur et al. |

OTHER PUBLICATIONS

Communication pursuant to Article 94(3) EPC, for Application No. EP18835905.3, 18 pages, dated Sep. 2, 2021.
Summons to attend oral proceedings pursuant to Rule 115(1) EPC, for Application No. EP18835905.3, 14 pages, dated May 18, 2022.
Notification from the International Bureau for International Application No. PCT/US2018/035969, one page, mailed Aug. 2, 2019.
Notification from the International Bureau for International Application No. PCT/US2018/035969, 109 pages, mailed Aug. 2, 2019.
Third Party Observation issued in International Application No. PCT/US2018/035969, four pages, dated Jul. 26, 2019.
Securities and Exchange Commission Filing by NYSE MKT LLC for a proposed rule change, File No. SR-2017-05, https://www.nyse.corn/publicdocs/nyse/rnarkets/nyse-arnerican/rule-filings/filings/2017/NYSEMKT-2017-05.pdf, dated Jan. 27, 2017, (32 pages: pp. 2-33).
Securities and Exchange Commission, Release No. 34-80700, File No. SR-NYSEMKT-2017-05, https://www.sec.gov/rules/sro/nysemkt/2017/34-80700.pdf, dated May 16, 2017, (19 pages: pp. 34-52).
Trader Update, Subject "NYSE MKT transition to NYSE American", https://www.nyse.corn/publicdocs/nyse/rnarkets/nyse-arnerican/Pillar_Update_NYSE_Arnerican_March_2017.pdf, Mar. 6, 2017, (two pages: pp. 53-54).
Specification for U.S. Pat. No. 10,127,615, "System And Method For Delaying An Executable Instruction That Would Otherwise Be Executable Immediately Upon Arrival At An Executing System" submitted with third-party observation dated Jul. 26, 2019, (55 pages: pp. 55-109).
International Preliminary Report on Patentability for International Application No. PCT/US2018/035969, 5 pages, mailed Nov. 20, 2019.
Notification of Transmittal of the International Search Report and the Written Opinion of the International Searching Authority, or Declaration in Application No. PCT/2018/035969 dated Aug. 27, 2018 (29 pages).

* cited by examiner

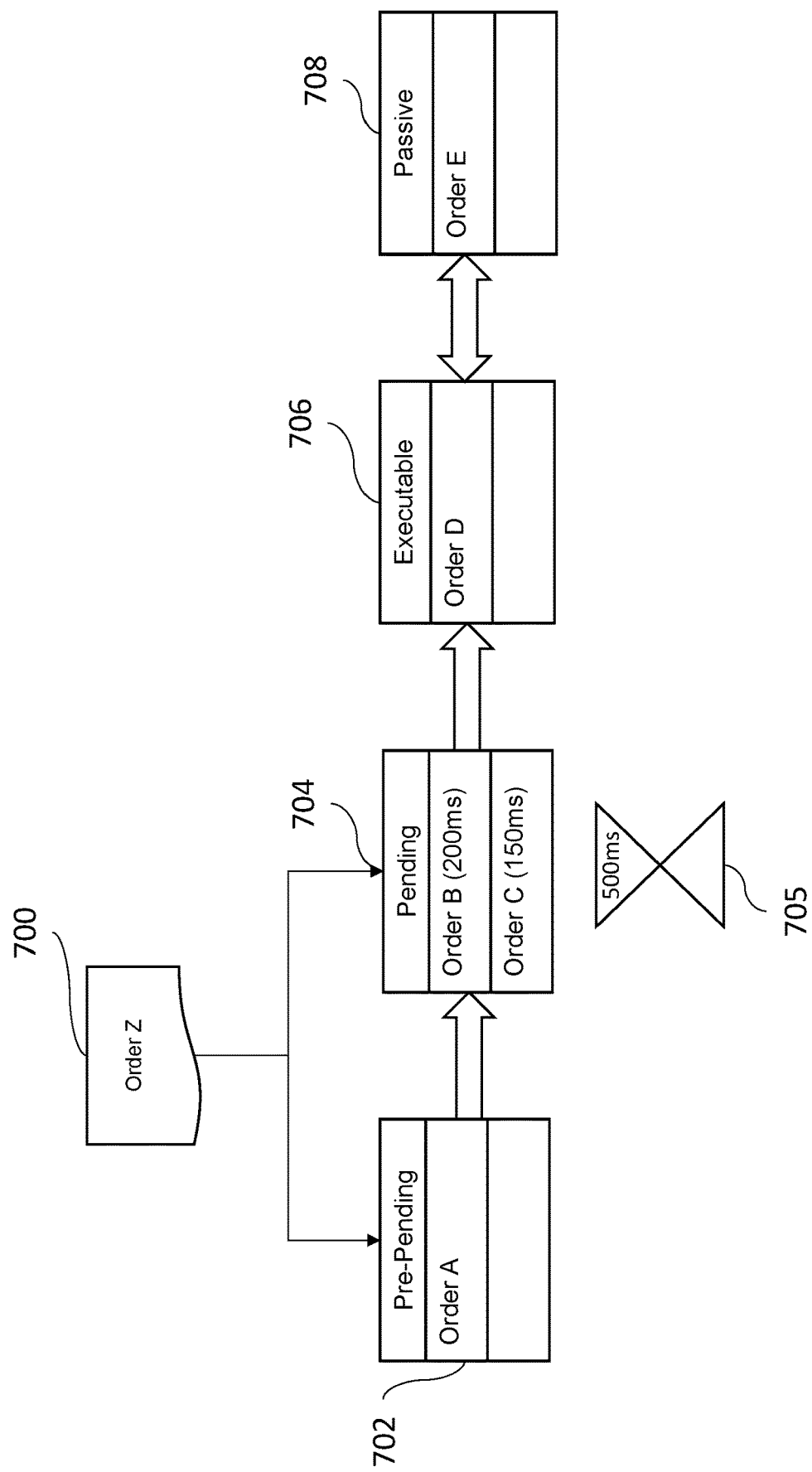

Fig. 7B

| Order Data | Is_Marketable | Timer (500ms) | Is_Live |
|---|---|---|---|
| Order A | True | True | True |
| Order B | False | True | True |
| Order C | True | 50ms | False |
| Order D | True | 350ms | False |
| Order E | False | 250ms | False |
| Order F | True | True | True |
| Order G | False | False | False |

DELAYED PROCESSING FOR ELECTRONIC DATA MESSAGES IN A DISTRIBUTED COMPUTER SYSTEM

CROSS REFERENCE(S) TO RELATED APPLICATION(S)

This application is a continuation of U.S. patent application Ser. No. 16/746,600, filed Jan. 17, 2020, now allowed; which is a continuation of U.S. patent application Ser. No. 15/997,232, filed Jun. 4, 2018, now U.S. Pat. No. 10,585,729, issued Mar. 10, 2020; which claims priority to U.S. Provisional Application No. 62/534,050, filed Jul. 18, 2017 and the entire contents of U.S. Publication No. 2015/0341422, which are hereby incorporated by reference herein.

TECHNICAL OVERVIEW

The technology described herein relates to receiving and processing electronic data messages in a distributed computer system. More particularly, the technology described herein relates to matching electronic data messages against one another once certain parameters are met including time-based delays or other dependencies that determine when new electronic data messages are eligible for matching.

INTRODUCTION

Distributed computing technology relates to networking multiple different computer systems together to allow the distributed system to handle one or more computational problems faster than a single system. For example, rather than have 1 computer answer a question in 100 years, 1000 computers (or 1000 processes working on 1000 different computers) can work to answer that same question in a month or two. Similarly, rather than one computer handling 1000 requests (for example, ordering books online), many computers can be programmed to handle (e.g., receive and process) such requests simultaneously.

Distributed computing is thus relevant in many different areas of data processing where large amounts of data are continually fed into a distributed system for processing. For example, traffic information, weather information, operating systems, internet commerce applications, and other real-time data processes can benefit from distributed computing techniques. Accordingly, in these, and other areas of computing technology, new techniques are continually sought after. In particular, techniques related to how electronic data messages may be processed in a distributed computing environment.

SUMMARY

In certain examples embodiments, a distributed computer system is provided. The distributed computer system includes at least one sequencer computing node and at least one matcher computing node. Electronic data messages are sequenced by the sequencer and sent to at least one matcher computing node. The matcher computing node receives the electronic data messages and a reference value from an external computing source. New electronic data messages are put into a pending list before they can be acted upon by the matcher. A timer is started based on a comparison of the reference value (or a calculation based thereon) to at least one attribute of a new electronic data message. When the timer expires, the electronic data message is moved from the pending list to another list—where it is eligible to be matched (by the matcher) against other, contra-side electronic data messages.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 7A and 7B are example data structures usable by the process shown in FIG. 2A-FIG. 4.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

A distributed computer system is provided that includes computing nodes, one of which is a sequencer. Other computer nodes may act as matchers. New electronic data messages are sequenced by the sequencer and sent and/or received, via a message bus, to/by at least one matcher computing node. The matcher computing node(s) receives the electronic data messages and a reference value from an external computing source. New electronic data messages are put into a pending list before they can be acted upon by the matcher node. A timer is started based on a comparison of the reference value (or a calculation based thereon) to at least one attribute of a new electronic data message. When the timer expires, the electronic data message is moved from the pending list to an order book—where it is eligible to be matched against other, contra-side electronic data messages.

Figure 1:
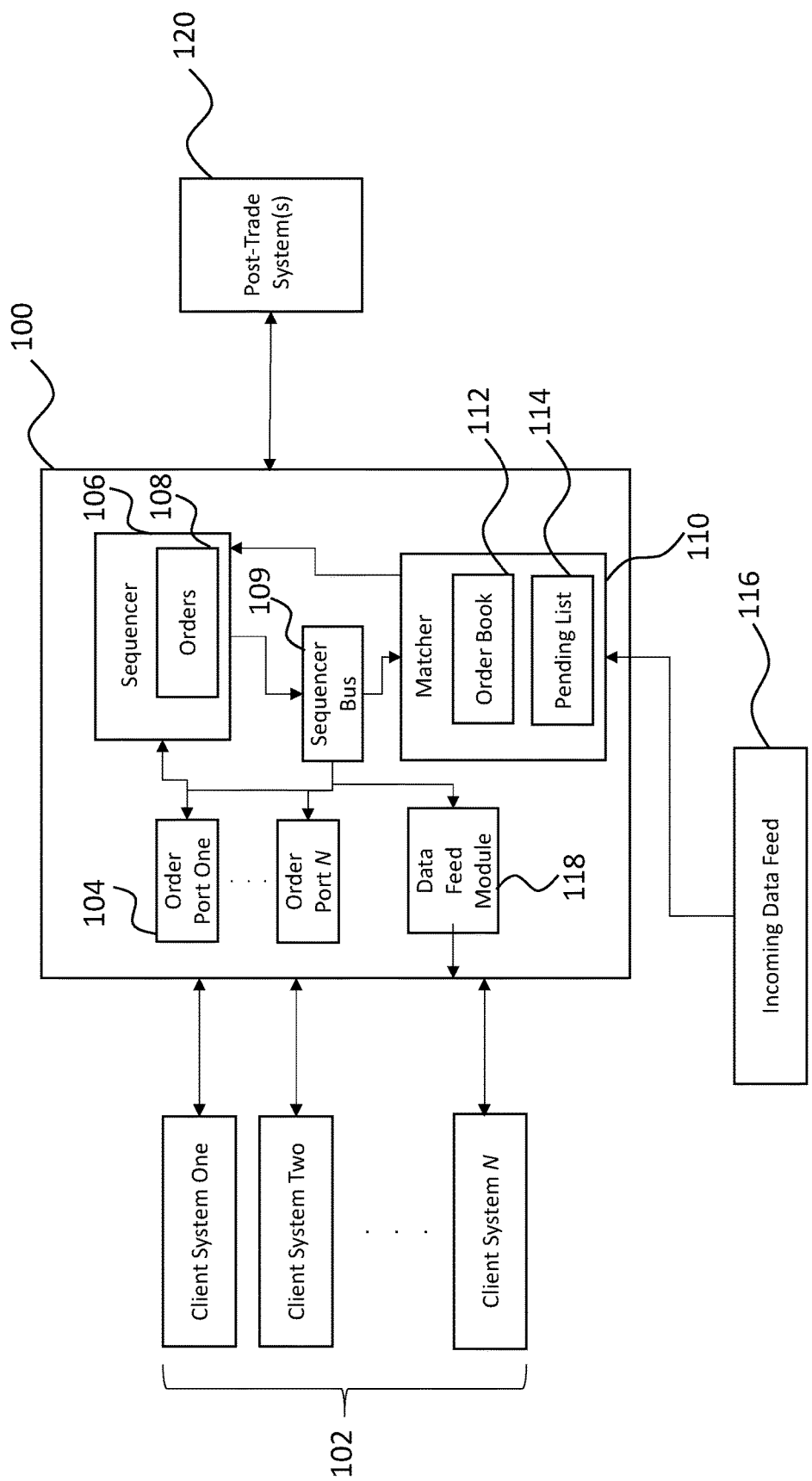
FIG. 1 is a block diagram of an example computer system for receiving and processing electronic data messages.
Figure 2A:
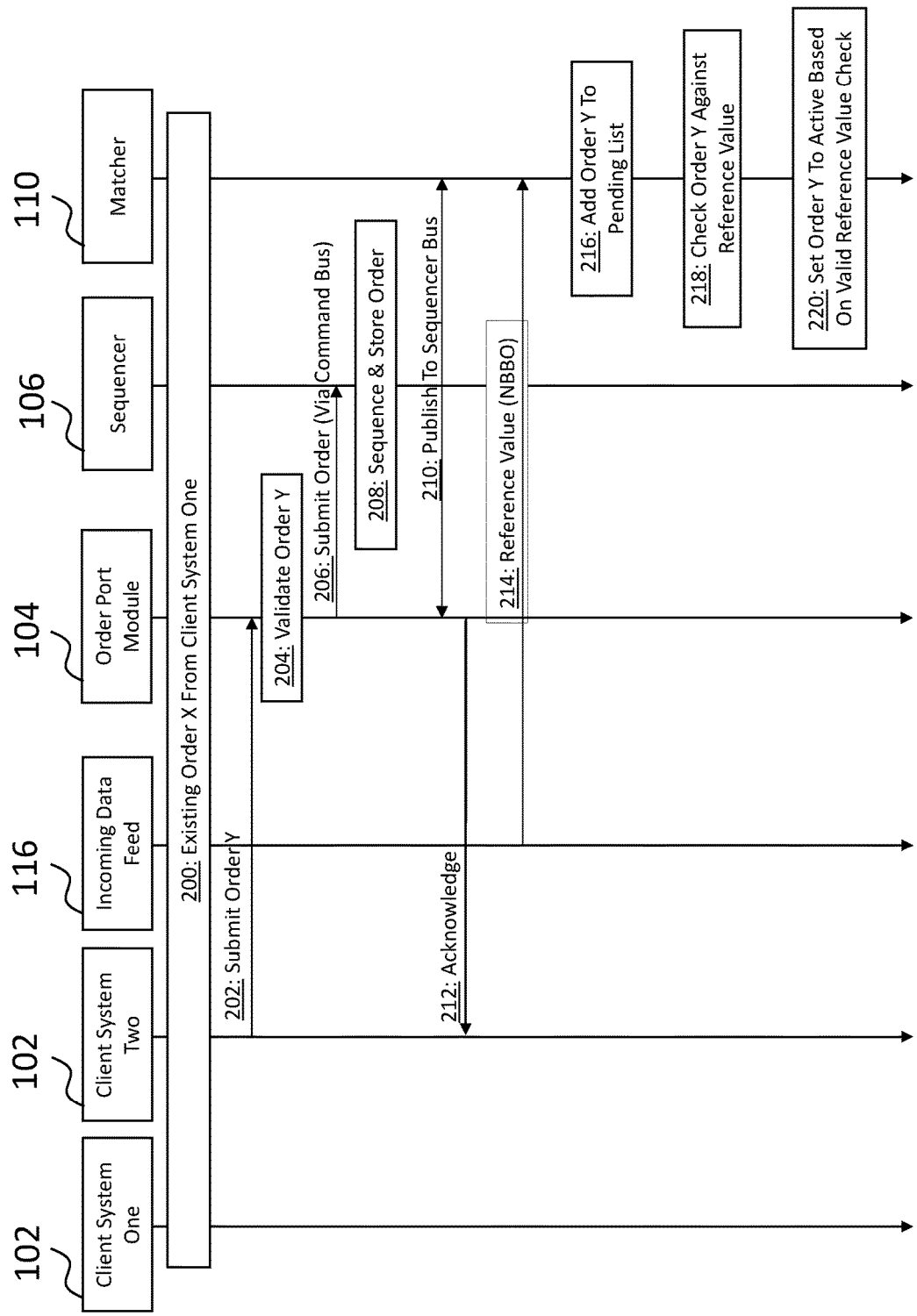
FIGS. 2A-2B are signal diagrams that illustrate communications for receiving and processing an electronic data message between the components shown in FIG. 1 according to certain example embodiments.
Figure 2B:
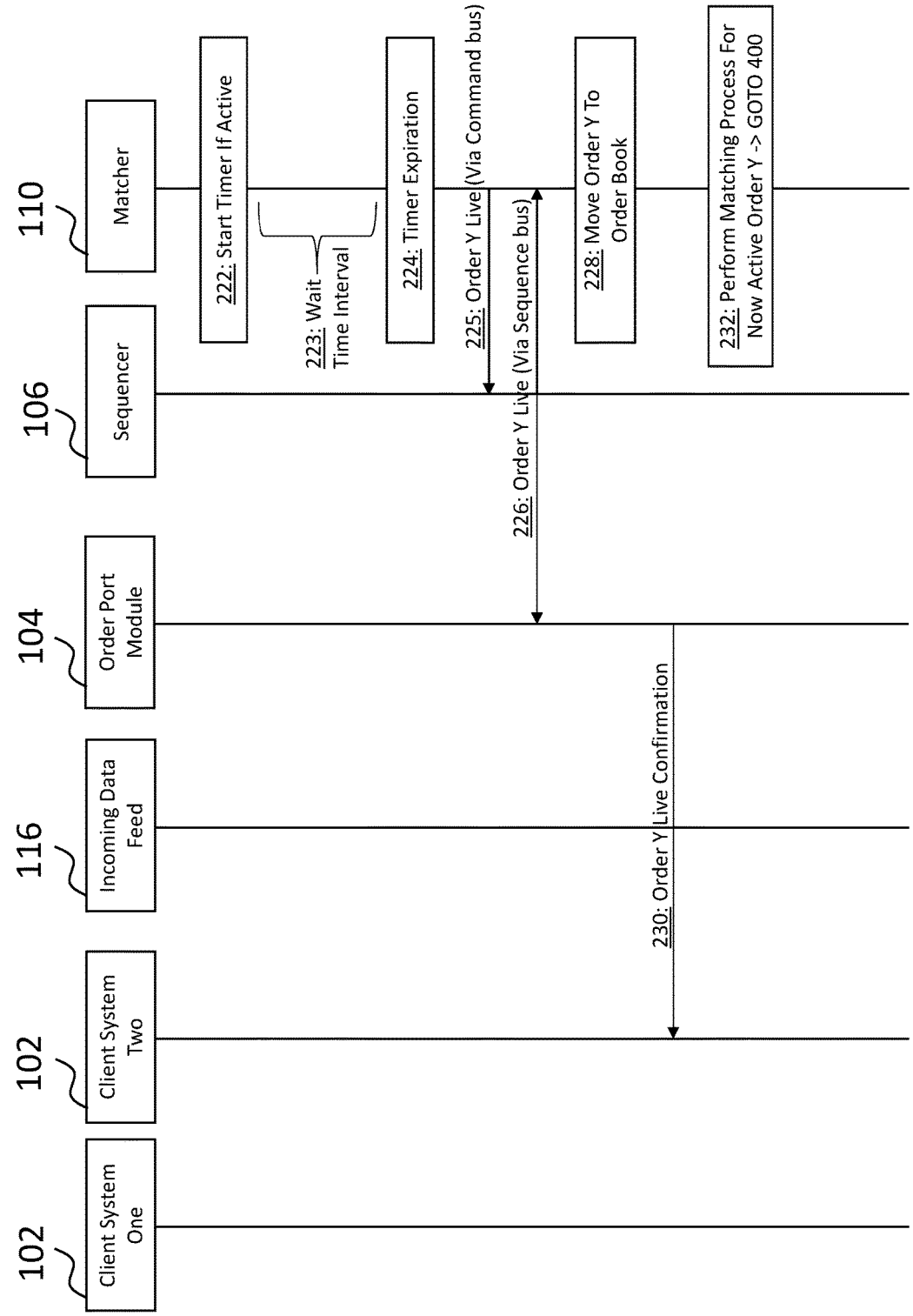
Figure 3:
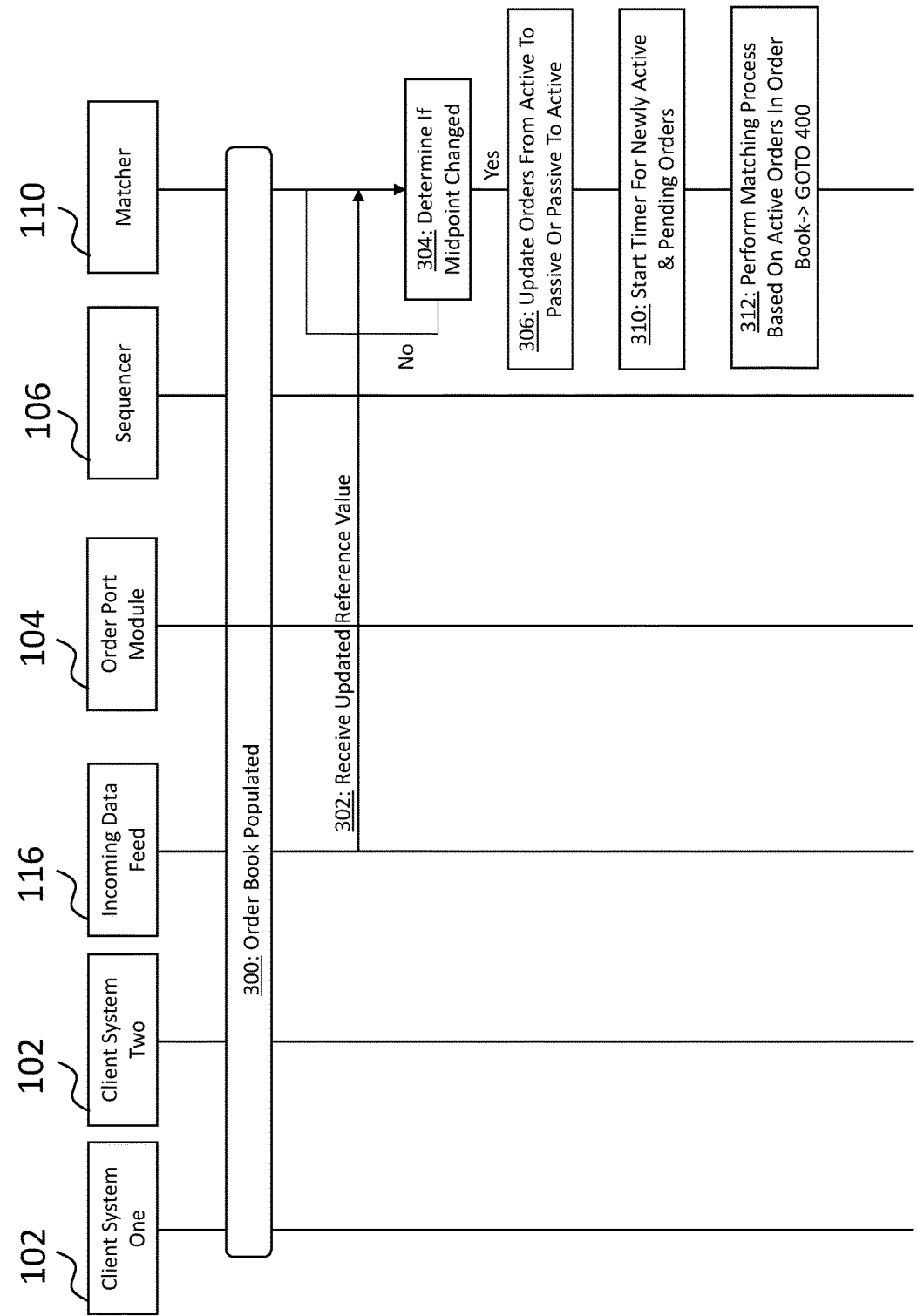
FIG. 3 is another signal diagram that illustrates another example for communications for receiving and processing an electronic data message between the components shown in FIG. 1 according to certain example embodiments.
Figure 4:
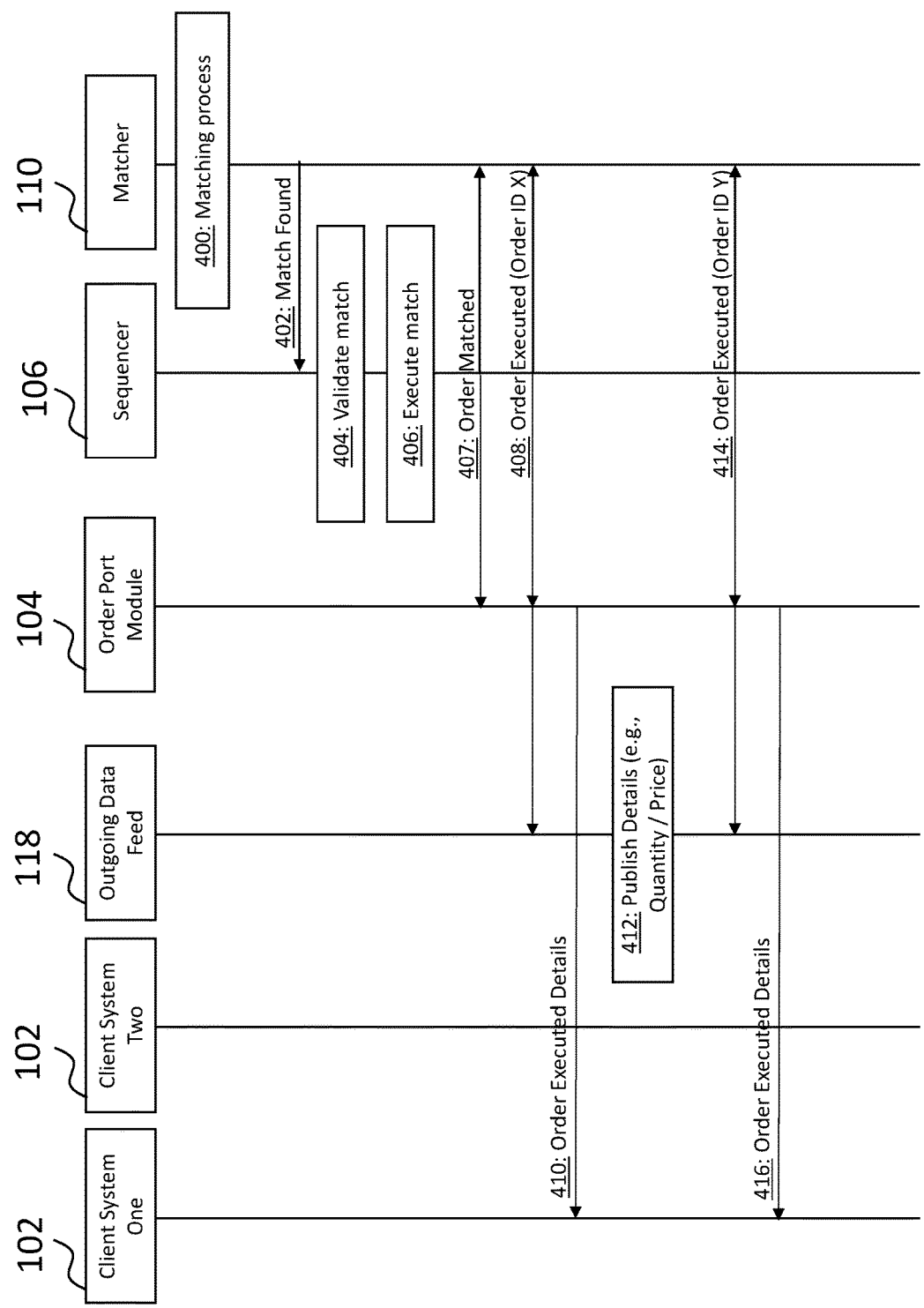
FIG. 4 is another signal diagram that illustrates how electronic data messages, or contents thereof, are matched against one another by the system shown in FIG. 1 according to certain example embodiments.
Figure 5:
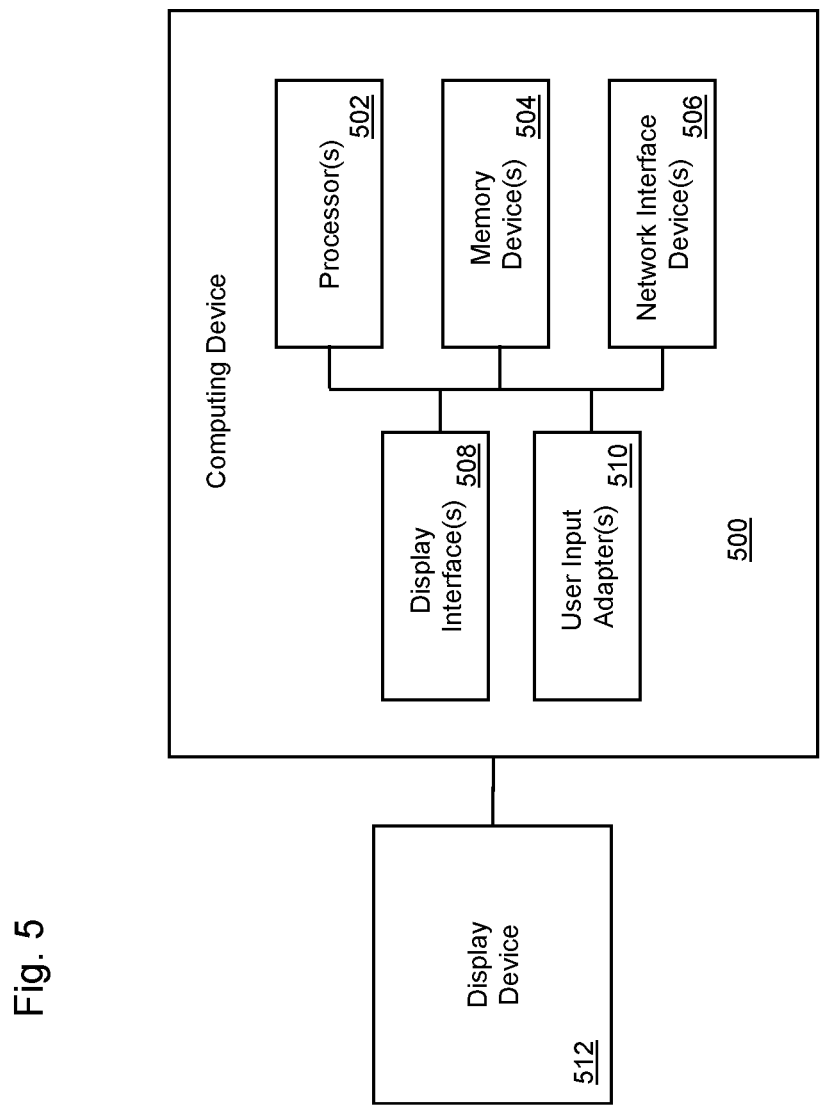
FIG. 5 shows an example computing device that may be used in some embodiments to implement features described herein.
Figure 6:
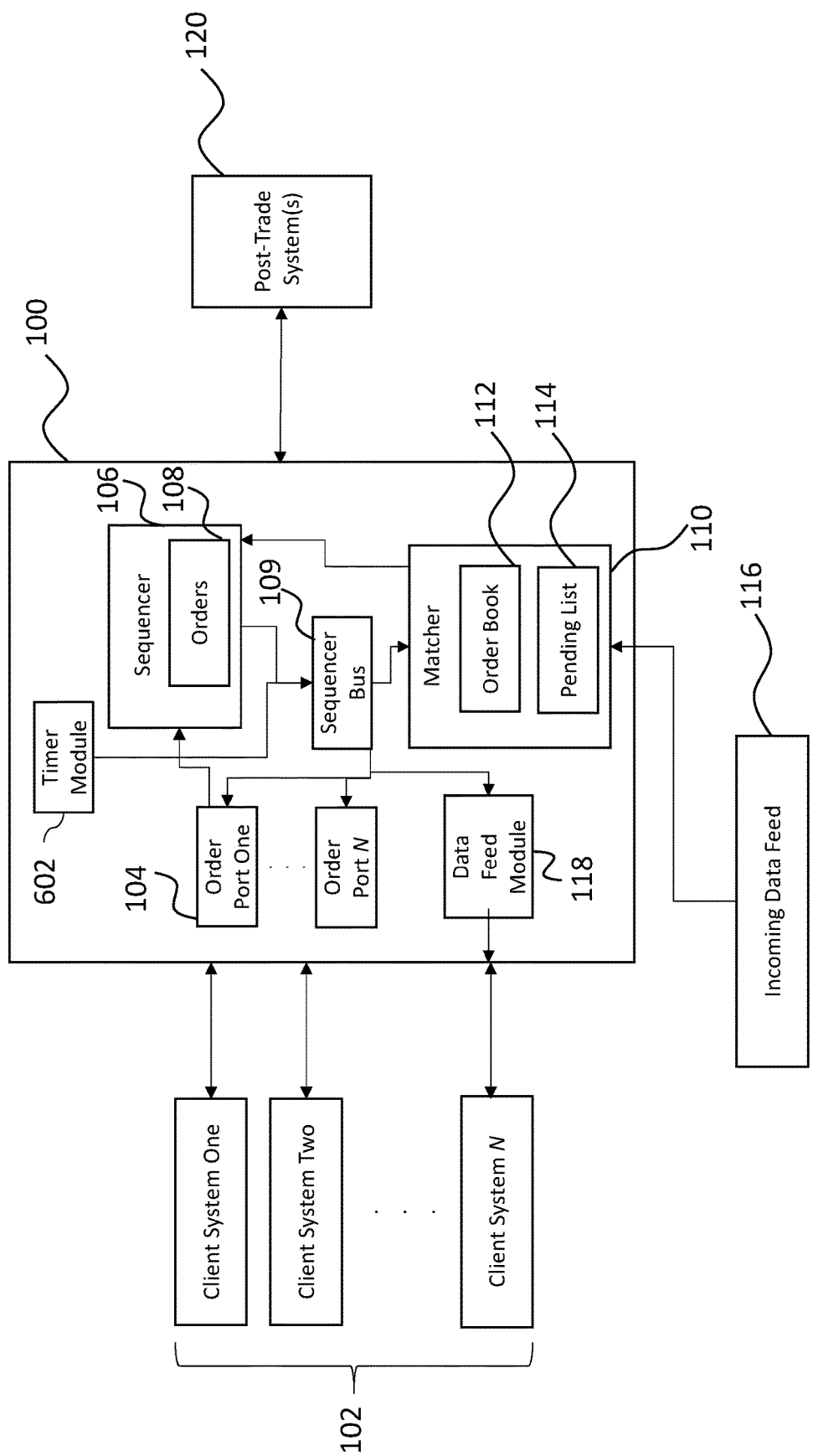
FIG. 6 is a block diagram of an example computer system that includes a separate timer component according to certain example embodiments.

FIG. 1 shows an architectural view of the distributed computer system according to certain example embodiments. FIGS. 2A-2B show processing and communication involved when a new electronic data message is received and processed by the distributed computer system. FIG. 3 shows the processing performed by a matcher node when the reference value (or the midpoint of the reference value) is changed. FIG. 4 shows the matching process, and the subsequent communications performed by the distributed computer system. FIG. 5 shows an example computer device. FIG. 6 shows an alternative implementation of the distributed computer system of FIG. 1. FIGS. 7A and 7B show example data structures that may be used store electronic data messages and/or orders (or reference to such elements).

In many places in this document, software modules (in certain instances a module may be referred as an "engine") and actions performed by those modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 5.

Description of FIG. 1

FIG. 1 is a block diagram of an example system that includes an electronic exchange computer system 100 (also referred as an "exchange" herein) programmed to receive and process electronic data messages transmitted, via an electronic communications network, from client computer systems 102.

Electronic exchange computer system 100 includes one or more computer systems (as shown in FIG. 5). In certain examples, multiple different computer systems (e.g., computer nodes) are provided and thus electronic exchange computer system 100 is also a distributed computer system. In other words, with multiple instances of the computer device in FIG. 5 may be part of the functionality provided by exchange 100. Different systems and/or components are included with exchange 100 and are designed to handle reception, processing, and post-processing handling of such electronic data messages. The components of the electronic exchange computer system 100 may include order port modules 104, sequencer 106, matcher 110, and data feed module 118. Each of these components may be a node that is part of the distributed computer system.

Client computer systems 102 can include personal computers, mobile devices, automated computer systems, and the like. Generally, client systems 102 can include any computer system (such as the computer system shown in FIG. 5) programmed to interface with exchange 100 (or components associated therewith) for the purpose of submitting electronic data messages.

The submitted electronic data messages can include a data transaction request that may be a request to process an "order" (also called an electronic order herein) that includes multiple different parameters and/or attributes for that corresponding order. Generally, the techniques herein apply to data transaction requests to process (e.g., enter) new orders. However, certain example techniques described herein may also be applied to other types of data transaction requests. For example, the data transaction request may be a request to modify or cancel an order. The term "order" is used herein to refer to a data transaction request for a given order. For example, each order may include a resource identifier (e.g., a ticker symbol), an order type parameter (e.g., whether to buy or sell). Other parameters may include a client ID that identifies the client sending the request (e.g., a company, person, etc. . . . ), a client order ID that is an identifier assigned to this order by the client (e.g., the identifier is generated by the client computer system 102 that submits the order to the exchange 100), an order attribute that specifies whether this a regular order, a discretion order, a midpoint order, or the like, a quantity value that indicates the quantity of the order, a MinOrder parameter where a value indicates a minimum order amount that this order can be matched against, a price parameter where a value indicates a particular price for the order subject to the data transaction request, a limit parameter that indicates the order is only to be active if a reference value (e.g., the NBBO reference value) or a calculated value based on the NBBO value (e.g., the midpoint) is within the bounds set by the value for the limit parameter. In other words, a value for the limit parameter may operate such that if the midpoint for the provided NBBO value is above (for a buy order) the specified limit value then the order may become passive (e.g., such that other contra-side orders will not match against it). In certain examples, other fields or parameters may be defined in the order and/or some may be optional.

As discussed herein, an electronic data message that includes a midpoint order may indicate a quantity value and a limit value—without providing a specific price value (e.g., because the price will be determined based on the reference value, such as, for example, the NBBO).

Electronic data messages can also include other requests for actions to take with respect to already submitted orders. This may include canceling or modifying an existing order. For example, a client computer system may submit an electronic data message that includes a request to cancel an order that is on the passive list 708.

Electronic exchange computer system 100 includes one or more order port modules 104 configured to receive (and perform processing on) electronic data messages transmitted from client systems 102. In certain examples, order port modules 104 function like a gateway for such transmitted electronic data messages. In certain example embodiments, a single "client" (e.g., a business) may have multiple separate client computer systems 102 that are all programmed for submitting electronic data messages to exchange 100. In certain examples, each order port that is maintained by the order port module 104 is a separate logical "port" by which client computer systems communicate and submit orders to exchange 100. For example, client A may have two separate computer systems 102 programmed to transmit electronic data messages to exchange 100. Both of those computer systems may be required to submit their electronic data messages through a single order port that is dedicated to client A. In other examples, client A may have two separate order ports dedicated for its use. Thus, in certain examples, the exchange 100 may include many separate order ports that are provided on a client by client basis.

In addition to being configured to receive electronic data messages, the order port module 104 may be programmed to perform validation functions on newly received electronic data messages. This may include, for example, validating that the fields or other parameters for the order included in the electronic data message are valid for a given order type (discussed in greater detail below). For example, an order that is submitted as a midpoint order type may be validated by being: 1) greater than a certain quantity (e.g., only orders for more than 100,000 are valid for midpoint order types), 2) from a certain client type (e.g., such as a broker or market maker client), and 3) with a valid limit price value. In certain examples, the order port for a given client may be programmed with additional validation tasks for that specific client. In certain examples, the order port module 104 may also handle communicating acknowledgements or confirmations back to client computer systems 102. In certain examples, each of the order ports (e.g., per client), may, like the matcher 100 and/or the data feed module, listen to the internal messaging bus (e.g., sequencer bus 109) of the exchange 100 for messages that have been generated by the sequencer and should be handled by the order port module 104. Each order port (e.g., per client) may be a separate service or process that is executed on a computing node of exchange 100. In certain examples, each order port process is hosted in its own virtual container or virtual machine and multiple order port processes may be hosted on the same computing node.

Exchange 100 may include a sequencer 106. The sequencer is a computer process or service that receives electronic data messages and sequences them into the exchange 100 for consumption by other services or processes (e.g., matcher 110) that are part of exchange 100. In certain example embodiments this may include annotating the received messages using a logical clock that is maintained by the sequencer 106. This allows the sequencer to maintain (and distribute) a totally ordered state of all of the messages that have been received by the exchange 100.

The sequenced messages are distributed across a messaging bus called the sequencer bus 109 that is provided as part of exchange 109. Using a message bus allows applications or services (e.g., such as, for example, matcher 110 and order port modules 104, data feed module 118, etc. . . . ) to communicate with each other without having to establish a direct connection between those applications. Instead, an application sends a message to a message bus, and the message bus handles communicating the message to other applications that are listening to the bus. This type of communication architecture can be especially beneficial for a one-to-many (or many-to-many) distribution of messages (e.g., a multi-cast network) among different applications.

In certain example embodiments, other types of messaging buses may be used by the exchange 100 and/or components or other systems related to exchange 100 (e.g., post-trading systems 120, client systems 102, etc. . . . ). In certain examples, exchange 100 may also include a command bus that is used by components to send messages to sequencer 106. In other words, one message bus may be used for sending messages from the sequencer 106 (the sequencer bus 109) and another may be used to sending messages to the sequencer 106 (a command bus). In certain examples, the functionality of the sequencer bus 109 and a command bus may be combined into one messaging bus.

Accordingly, in certain examples, different services, modules, or other applications (e.g., matcher 110, data feed module 118, etc. . . . ) can then act on the sequenced messages that are sent out by the sequencer 106 across the sequencer bus 109. Thus, in certain instances, the same message published to the sequencer bus 109 may cause different functionality to trigger in the various applications or services that are listening to the sequencer bus 109 and the message broadcast thereon. Examples of sequencers are provided in U.S. Publication No. 2015/0341422, now U.S. U.S. Pat. No. 9,712,606, the entire contents of which are incorporated by reference herein.

Sequencer 106 also stores the electronic data messages (or the orders therein) in a data store 108 that allows the sequencer 106 to keep track of the status of the submitted orders (even after they have been received and sequenced). This may include keeping track of the number of shares associated with a given order. Thus, for example, an electronic data message could be received that cancels an order being maintained by the sequencer. Upon receipt of this command the sequencer will cancel the order. But if a match is found for that same order (e.g., by matcher 110), that match will be invalidated because the sequencer 106 controls whether or not a found match will be valid (based on the availability of the order or shares for that order). Thus, the sequencer 106 can also be thought of as an order manager.

In certain example embodiments, the sequencer 106 can also act as a matcher that matches electronic data messages (or the orders specified therein) against each other. This type of setup may be advantageous from a performance perspective because the matcher and sequencer would be operating within the same service. Because the matcher is located with the sequencer the time from when the sequencer receives an order to when that order is potentially matched against other orders may be decreased. However, as discussed herein, in certain examples, some types of orders (such as a midpoint extended life orders) may be sequenced but not matched by the sequencer 106. Thus, certain types of orders may use the matching and sequencing functionality that is provided by the sequencer 106, while other types of orders may only use the sequencing functionality of the sequencer 106. In certain examples, an existing sequencer and matcher service of an exchange computer system may be modified (e.g. to add functionality) such that certain types of orders use the sequencing functionality but not the matching functionality.

Matcher 110 is another software module or service configured to receive (or listen for) electronic data messages communicated across the messaging bus of the exchange from the sequencer 106. The messages that are received by the matcher 110 may typically be those messages that contain orders that the sequencer 106 did not attempt to match. Thus, the matching process for such orders may be viewed as being offloaded to the matcher 110. The offloading of the processing that is performed by the matcher 110 to other computing resources may allow for more complex processing to be performed without slowing down the determinism of the sequencer 106.

In certain examples, matcher 110 and sequencer 106 are different services that use different processing resources of the exchange 100. For example, the sequencer 106 may be executed on a first hardware processor that is part of the exchange 100 and the matcher 110 may be executed on a second hardware processor that is also part of the exchange. In certain examples, the sequencer and 106/or matcher 110 may be executed within separate virtual machine environments.

In certain example embodiments, there are multiple different matchers included in exchange 100 and each matcher is run on a different node within the exchange computer system (e.g., each matcher is running within its own separate virtual machine). In certain examples, multiple different ticker symbols are served by a single matcher. Thus, for example, if exchange 100 performs matching for 5000 different ticker symbols, there may be 1000 different matchers deployed (each being their own node in the system). The 5000 different ticker symbols may be distributed across the 1000 different matchers. Some matchers may handle matching for 20 different ticker symbols while some matchers may only have a single ticker symbol (e.g., for a ticker symbol in which many matches are performed per day).

In certain example embodiments, the pre-pending and pending lists (e.g., 702 and 704 respectively) may be created on a per matcher basis. In other words, the same pre-pending and pending lists may include orders from multiple different ticker symbols that are being handled by the same matcher. In certain example embodiments, the executable list 706 and passive list 708 may be created on a per ticker basis. Thus, if there are 5 tickers being handled by a given matcher, then there may be 1 pre-pending list (702), 1 pending list (704), 5 separate executable lists (706, 1 for each ticker), and 5 separate passive lists (708, 1 for each ticker). In certain example embodiments, each matcher 110 may listen to the sequencer bus 109 for messages with orders that relate to tickers handled by that matcher. If a matcher does handle the ticker indicated in the message, it may process the message according to the techniques described herein. If the matcher does not handle the ticker indicated in the message, then the message may be ignored by this specific matcher.

Orders that are received and/or processed by the matcher 110 are stored in order book 112 and/or pending list 114. Orders that are stored in these two data structures may be either marked as active or inactive or any other state that may be relevant.

Order book 112 can be a data structure (e.g., a database, flat file, list, etc. . . . ) that holds multiple entries in electronically accessible memory (e.g., RAM, cache, registers, hard disk drives, etc. . . . ). Typically, an order book 112 has two sides, side X and side Y, which can be bid and offer/ask or buy and sell sides for the same instrument in the electronic order book. The two sides of the order book may be represented as a list pair data structure (one list for the buy side and one list for the sell side). In certain examples, each list of the list pair may be sorted according to one or more attributes of the orders that are part of the respective lists. For example, the orders in the lists may be sorted according to a price value of the order and then according to a timestamp for the order (or sorted by just the timestamp). Thus, if two orders have the same price value, the one with the earlier timestamp will be sorted "higher" into the list. Further discussion of order books is described in U.S. Publication No. 2017/0004563, U.S. Pat. No. 10,395,302, the entire contents of which are hereby incorporated by reference.

In certain examples, order book 112 may include an executable list 706 and passive list 708.

The pending list 114 shown in FIG. 1 may similarly store orders that are pending. Each order in the pending list may be marked as active or passive. Active orders will typically have a timer associated with them that is counting down. The expiration of a timer for an order may cause it to move to the order book data structure. In general, expiration of a timer may signal to the system (e.g. matcher 110) that the state of the corresponding order has changed (or should change) and that further action should be taken. In certain examples, pending list 114 includes, for example, a pre-pending list 702 (e.g., newly received orders that are not marketable) and a pending list 704 (those with active timers)

In certain example embodiments, the pending list 114 and the order book data structure 112 may be separate data structures or may be the same data structure. In other words, it will be appreciated that different types of data structures may be used to organize orders according to specific order attributes.

For example, one "list" may be used and the orders may be differentiated within that list based on the respective attributes or parameters of the orders. In another example, four separate lists may be used. FIGS. 7A (four data structures or lists) and 7B (one data structure) illustrate example techniques for organizing orders according to certain example embodiments.

In FIG. 7A orders are distributed between 4 separate lists. A first list 702 stores passive and pre-pending orders (e.g., those orders that are not marketable or actionable when received by the matcher). A second list 704 holds pending orders (e.g., those orders for which their timer has started, but not expired). A third list 706 holds executable orders that are part of the order book. A fourth list 708 holds orders that are now passive (non-executable) but still in the order book. New orders, such as order Z 700, start on either the pre-pending list 702 or the pending list 704. As discussed herein, the list that order Z 700 starts out on may be determined based on whether order Z is marketable when the order is initially classified. If order Z is not-marketable, then it may be placed onto the pre-pending list 702.

If, however, order Z 700 is marketable (or it becomes marketable while on the prepending list 702), it is then placed into the pending list 704 where a corresponding timer 705 for that order may be started. As discussed herein, the timer may be for any length. In this example, the timer 705 is for 500 ms and order B has 200 ms expired and order C 150 ms expired. Once the timer for these orders is expired they move to executable list 706. But if the orders become non-marketable while on list 706, they may be moved to passive list 708.

FIG. 7B shows another data structure 750 that combines all of the orders into one data structure (e.g., one list or one order book). Each entry in the list may have multiple different parameters. Order data 752 defines the unique identifier for the order and other data used for the order (e.g., quantity, price, timestamp information, etc. . . . ). Thus, order data 752 may represent multiple different columns of data. Is_Marketable 754 is a Boolean that defines whether the order is marketable or not with respect to the current state of the order book (or other reference). Timer 756 represents the data for a timer for a given order and whether a timer has been initiated or not. In certain examples, the timer column may be broken into a Boolean value for whether or not the timer has been triggered and another column for the timer value when the timer is active. Is_Live 758 represents whether the order is currently live and available to be matched against (e.g., will the exchange 100 allow another contra-side order to match against it).

As can be seen from the above examples, the orders may be divided into two or more states or statuses. For example, a first status for an order may correspond to the time period before expiration of a timer. Thus, for example, an order may be at a first status when in list 702 or 704 (as the timer either hasn't started or is still active). And that same order may be at a second status when its timer expires. Thus, for example, a second status may include when the order is in lists 706 or 708. Such status may be further defined based on the comparison determination that is discussed herein.

In certain examples, the lists may be maintained in an ordered state. For example, orders with false values for Is_Live or Is_Marketable in data structure 750 may be sorted to the bottom of the data structure. This type of processing may allow for increased sorting efficiency for finding orders that are eligible for matching (e.g., those that are live and marketable). In certain examples, when the matcher 110 is performing a matching process it may walk the list of orders and skip those with Is_Live or Is_Marketable values that are false. This may also allow for a more efficient search of the data structure for locating contra-side orders for matching (e.g., by narrowing the search space).

Returning to FIG. 1, matcher 110 may also be configured to receive reference data (e.g., such as a number) via an incoming data feed 116. In certain example embodiments, the reference data may include a high and low value, such as, for example, a national bid and offer value(s). Thus, the reference value may include two different reference values that may correspond to, for example the ask price of an instrument and the bid price of that same instrument. The reference value that is received via the incoming data feed (or another value, such as a midpoint between two reference values) may be used to determine how the orders in the order book and/or pending list may be processed. This is discussed in greater detail in connection with FIG. 3. In certain examples, the reference value is determined based on a current state of the order book 112 (e.g., is a calculation based on the orders contained in order book 112). In certain examples, the reference value is based on a combination of the externally received data and a calculation performed based on a current state of the order book 112. In certain examples, in response to reception of this data (the reference values or other similar data), the Is_Marketable state of the orders may be updated (e.g., in data structure 750).

Data feed module 118 is another service that is part of exchange 100. Like matcher 110, the data feed module 118 may listen for messages communicated over an internal messaging bus of the exchange 100. The data feed module 118 may be responsible for receiving messages communicated by the sequencer 106 and generating a data feed that is sent out from the exchange 100 to any client that is listening to the data feed provided by module 118.

Exchange 100 may also communicate with post-trade system(s) 120, such as, for example, clearing and settlement trading systems.

In certain example embodiments, exchange 100 may also include a timer module or component 602 as is shown in FIG. 6. As described herein, the examples applied to FIG. 1 may equally apply to the system shown in FIG. 6, with the exception of the timer module 602 being located separately from matcher 110.

Timer module 602 is an application or module that is a separate from the matcher 110 and sequencer 106. In particular, the timer module may be a separate process or service that operates on hardware processing resources that are separate from those used by the matcher 110 and/or sequencer 106. The job of the timer module 602 may be to keep track of the timers for all of the orders for which timers have been initiated and, upon expiration of the timer, trigger a message of such expiration that is transmitted across exchange 100.

The following is an example of how such an implementation may be carried out in the example system shown in FIG. 6. When a timer for a given order is to be started, a message may be transmitted over the command bus to the sequencer 106 for sequencing. Sequencer 106 may sequence the timer start message and broadcast it out over the sequencer bus 109 for any applications or modules that are listening for such messages. In this example, timer module 602 may be programmed to accept and act upon the reception of such messages. The timer start message may include an orderID or other identifier (e.g., an internal identifier) for the order for which timer is to be started. Upon reception of the timer start message, timer module 602 may start a timer for that order and keep track of the timer for that order until the timer expires. When an individual timer for an order expires the timer module 602 may then generate and send another message over the command bus to the sequencer 106 that the order is now live. The sequencer 106 may sequence the message and the matcher 110 may pick up the sequenced message from the sequencer bus 109 and mark the indicated order as live (or move the indicated order to the appropriate list).

In certain examples, the messages that are sent between the timer module 602 and the matcher 110 (or other modules) may be sequenced messages as described above or may be non-sequenced messages (e.g., that are sent directly between the two separate modules).

In certain example embodiments, the matcher 110 may be able to operate more quickly and/or efficiently by offloading the timer functionality to a separate process and/or service (the timer module above) because the matcher 110 does not need to keep track of all of the timers for each order. This may reduce the processing load of the matcher 110 and allow processing resources that are devoted to the matcher 110 to concentrate on the matching process.

Description of FIGS. 2A-2B

FIG. 2A-2B are signal diagrams that illustrate communications for receiving and processing an electronic data message between the components shown in FIG. 1 according to certain example embodiments.

At 200, at least one existing data transaction request or order (order "X") is stored in the order book data structure 112. Order X had been previously submitted by client system one 102. Order X has a valid limit price (e.g., Order X is considered marketable at the current NBBO price(s)) and is currently resting in the order book 112.

At 202, client system two 102 submits, via an electronic communications network (e.g., via the Internet or other network connection to the exchange 100) and as part of an electronic data message, a new data transaction request, which in this example is a request to enter a new order "Y". As noted herein, the order that is part of the electronic data message and may include different parameters or attributes (e.g., a limit price parameter, a client order ID, an order type parameter, and the like).

At 204, the order port module 104 for client system two receives order Y and performs a validation process on the submitted order. In certain example embodiments, if there is a validation issue with a submitted order, then the order port module 104 may generate and submit a response to the submitting client system for that order detailing the validation error that occurred. On the other hand, if the order is validated, then the order port module forwards the submitted order (or the electronic data message that contained it) to the sequencer 106 via a command bus at 206. As noted above, the command bus is a messaging bus that allows other applications and systems to submit messages that are to be processed by the sequencer 106 (e.g., the sequencer only listens for messages published to the command bus). In certain examples, the command bus (not shown) is separate from the sequencer message bus 109 shown in FIG. 1.

At 208, the sequencer 106 receives and processes the electronic data message. This includes sequencing order Y into the global state of the exchange 100 and then storing order information regarding order Y with the sequencer 106. Further details of such sequencing may be found in U.S. Publication No. 2015/0341422, now U.S. Pat. No. 9,712,606, the entire contents of which are incorporated by reference. In certain example embodiments, the sequencing process includes generating an order identifier for order Y. This is an identifier generated by the sequencer 106 and may be different than the client order Id included in the originally submitted electronic data message from client system two 102. The sequencer 106 may store a map between client order identifiers and order identifiers. The sequencer 106 may also store information regarding submitted orders, such as, for example the total quantity associated with that order, a total quantity of size that has already been matched, the ticker symbol for which the order is associated with, a customer identifier, and/or other related order information.

At 210, the sequencer 106 then publishes a message to the sequencer bus 109. The message may include the details of Order Y (along with the order Id generated by the sequencer for that order). Any application, module or other system that is "listening" to the sequencer bus 109 may then receive that message and take action in response to that published message. In this example, the matcher 110 and the order port module for client system two 102 are both interested in the message that has been published across the sequencer bus. Thus, both the order port module 104 and the matcher 110 may receive the same message. However, as discussed herein, these two different modules may take different actions based on the same message.

At 212, the order port module 104 picks up the published message regarding order Y from the sequencer bus 109. In response to receiving the message, the order port module 104 generates and transmits an acknowledgement message back to client system two 102 that indicates that the order submitted at 202 has been accepted by exchange 100. The acknowledgement message may also include other details of order Y (e.g., the order identifier assigned by the sequencer 110 at 208).

At 214, matcher 110 receives a reference value via incoming data feed 116. In certain examples, the reference value may be a national best bid and offer (NBBO) value for a given ticker symbol (e.g., a stock, bond, or other instrument). In certain examples, the incoming data feed 116 is configured to deliver updates for a reference value directly to matcher 110. In other examples, the incoming data feed 116 may deliver reference values to the sequencer 106, which may then publish the reference values to the sequencer bus 109. In certain examples, the sequencer 106 may also sequence the updated reference values. Once the matcher 110 receives a new NBBO it may store it locally for use in one or more processes that use the NBBO. For example, the NBBO may be used to compute a midpoint price.

At 216, order Y (which has been received by the matcher 110 at 210) is then added to pending list data structure 114. At 218, the matcher 110 compares the limit price that was included as a parameter with order Y to a midpoint price calculated from the reference value received at 214. If the limit price for a bid order is greater than the midpoint or the limit price for an offer order is less than the midpoint, then the order is determined to be marketable (e.g., the order would be eligible to match against other orders).

In certain examples, the newly received order is checked or compared against the reference value (e.g., prior to be being placed into a list) and based on that check the order is added to the appropriate list. For example, if the order is not marketable then it may be added to, for example, the pre-pending list 702. If the order is marketable then it may be added to the pending list 704. In certain examples, (e.g., when one data structure is used) the appropriate flags for an entry into a data structure may be set based on determination of whether the order is marketable or not. In certain examples, the comparison may be used to determine whether or not to start a timer. The comparison may include comparing a value, attribute, or property of the newly received order (e.g., the limit price) to a value, attribute, or other property (e.g., a best bid and/or offer value) that is associated with one or more other orders (e.g., resting orders) or an order book. The value, attribute, or property of the newly received order is generally a value that has been specified by the client, customer, or user that submitted the order.

In certain examples, use of reference data may include determination if there has been a change in the reference data (of which the NBBO or the EBBO, European Best Bid and Offer, are examples thereof). Alternatively, it may determine if a calculation (of which the midpoint is an example thereof) that is based on the reference data has changed. Other examples of reference data changes may include, for example changes in an executable price (as indicated by the reference data) of a given instrument.

At 220, based on the results of the comparison at 218, order Y, now part of the pending list 114, is marked as active or inactive as a result of the marketability determination (order Y may also be marked as marketable or non-marketable within the pending list 114). In other words, if order Y is marketable it is marked as active. If order Y is determined to be non-marketable, then it is marked as inactive.

In certain example embodiments, the matcher 110 may be configured to accept orders that do not include a limit price (e.g., the order will match at any midpoint price). In such instances, no comparison to the calculated midpoint (or other reference value) may be made. Instead, new orders without limit prices may be placed one the pending list and their associated timers started. Once their timers expire, then they will be added to the order book 112.

In certain example embodiments, all orders, regardless of their limit price, may have their associated timers started upon being received. In other words, step 218 may be removed or skipped for all new orders. Instead, only when a timer expires will a comparison between the current reference value and the limit value of the order be made.

At 222, if order Y has been marked active, a timer is started for order Y. This timer may function to keep track of how long a given order is to stay on the pending list before being moved to order book 112. In certain examples, the timer is set for 1 second, 500 milliseconds, or another value.

While a timer is used in the example shown in FIG. 2B, other types of triggers, events, or the like may be used to control when an order is moved from one list (e.g., the pending list) to another list (e.g., the order book). In certain examples, orders may be put into a pending list at the start of an auction process and then moved to an order book at the conclusion of the auction (e.g., to determine the price of the auction). In other examples, an order may move to the order book based on manual interaction (e.g., an administrator or some other user indicating that the order is move). In certain examples, attributes of the order itself may be used to determine when an order moves from a pending list to the order book. For example, a client computer system may indicate a relative (e.g., 30 minutes) or absolute time (e.g., 1 pm EST) for when an order is to move to the order book from the pending list. In certain examples, the movement of orders may be based on one or more attributes of the current state of the market. In certain examples, the length of the timer may vary based on the attributes of the order (e.g., the size, limit price, etc. . . . ).

In certain example embodiments, the start of a timer may be conditioned or controlled based on the reception of one or more events. In certain examples, the event may be received from a source that is external to the exchange 100 and/or the matcher 110. In certain examples, the event may be sequenced by the sequencer 106 and applications or processes listening for such events (e.g., via sequencer bus 109) may act on those events (e.g., to then determine if an order is marketable, start a timer, etc. . . . ).

An event type may be associated with determining that an order is in a marketable state. In other words, based on the marketable state determination, an event may be created and used to trigger the start of a timer for that order. In certain examples, an event may be related to reception of a reference value (e.g. the NBBO value) or other value that is subsequently used to determine if an order is in a marketable state.

In certain examples, an event may be based on a determination that the quantity of an order is greater than (or less than) a threshold quantity. For example, the matcher module may be programmed to match certain types of resting orders against counter party orders only if the size of the counter party order is greater than a defined quantity (which may be the same or different than the threshold quantity). In such examples, new orders with sufficient size (e.g., greater than the threshold quantity) may have timers started for them while other orders (e.g., those with less size) may not have timers started. The orders with timers may be eligible to match against the resting order (e.g., as the new order satisfies the size requirements put in place by the resting order). The new orders without sufficient size may not have timers started and may be directly acted upon by the matcher. It will be appreciated that such lower sized orders may not match against certain types of resting orders (e.g., those that require a match be performed for at least the defined quantity).

In certain examples, orders with sizes less than a threshold may trigger timers while orders that are above a size threshold may not trigger a timer (e.g., they may be immediately placed into the executable list).

In certain examples, an event that is used to trigger a timer may be based on determination that an order is associated with a specific customer identifier or is of a particular customer type. Orders of a specific customer type (or not of a specific customer type), may trigger a timer for that corresponding order.

In certain examples, orders may include a value (e.g., a flag) for a parameter that indicates whether or not the timer functionality described herein will be applied to that incoming order. In certain examples, two or more conditions may be needed to trigger a timer for an order. For example a first condition that the order satisfies the size threshold and a second condition that the order is marketable.

In certain examples, the timer for an order on the pending list is started as a result of the first time that corresponding order is determined to be marketable. Thus, for example, an order may be added to the pending list 114 when it is in a non-marketable state. However, because the order is initially in a non-marketable state (and thus "inactive" upon being added to the pending list), the timer for that order is not started. If the reference value (or the midpoint based on the reference value) provided by the incoming data feed changes (as shown in FIG. 3), then the status of previously inactive orders on the pending list may change to active and a corresponding timer may start.

At 223, the timer for order Y counts down and expires at 224. When the timer for an order that is on the pending list expires, the matcher 110 generates and sends a message to the sequencer 106 (via the command bus) that the order is now live at 225. In response to reception of this message, the sequencer 106 will publish a message, at 226, over the sequencer bus 109 that that order is live. The order live message on the sequencer bus will then be received by matcher 110 and other applications (e.g., the order port module, a backup sequencer service, a backup matcher, etc. . . . ) that are listening to the sequencer bus 109. In certain examples (e.g., when the timer module is separate from the matcher module), an order live message may originate from the timer module 702.

Once the matcher 110 receives the order live message from the sequencer 106, order Y will be removed from the pending list and added to the order book 112 at 228. Thus, referring to the example data structure shown in FIG. 7A, an order that is live may be moved from the pending list 704 to the executable list 706. In certain examples, movement of an order off the pending list may additionally involve checking if the order is still marketable. If the order is not marketable then the order may be moved directly to passive list 708.

In certain examples, the movement of an order from the pending list 114 to the order book 112 may then trigger a message that is sent to the sequencer 106 via the command bus for the sequencer. Messages may be used to indicate that the order (Order Y) is now "live" (no longer pending). Note, however, that even if an order is "live" (and in the order book) it may still be inactive (non-marketable) based on the limit value of that order and/or the currently calculated midpoint value based that is based on the reference value.

At 230, the order live message that has been published over the sequencer bus 109 is picked up by the order port module 104 (230 may occur before 228). The order port module 104 then communicates that order Y is active back to client system two 102 at 232.

In certain example embodiments, messages relating to order Y going "live" on the order book may be publically made available. In particular, data feed module 118 may pick up the live message published to the sequencer bus and generate an electronic data feed message that is delivered to all third party computer systems that receive messages via data feed module 118. However, in the example shown in FIG. 3, order Y may be considered a "hidden" order because the price at which it will trade is at the midpoint of the NBBO. Accordingly, exchange 100 may not report the details of order Y (e.g., the available size and/or price is still hidden) to third parties. For example, the data feed module may report that a new order has been added without indicating the price or quantity of the order.

At 232, once the matcher 110 receives the order live message that is delivered over the sequencer bus 109, the matcher 110 may then perform the matching process (detailed in FIG. 4) for the order that is now live (e.g., the live order is either matched with a contra-side order that is active and in the order book 112 or placed into the order book 112).

It will be appreciated that the order of the elements in FIG. 2A-FIG. 4 is not required unless otherwise noted. For example, elements 218 and 216 may be switched such that the reference value is checked (e.g., compared against) before addition of the new order to the pending list (or pre-pending list).

In certain examples, during the processing shown in FIG. 2A-FIG. 4, exchange 100 and the matcher 110 may be performing other tasks. For example, the matching process performed by matcher 110 may be running (e.g., one or more instances of the matching process may be executed) while order Y is on the pending list (in 216) or the pre-pending list. In other words, multiple separate instances of the matching process may be performed between the time order Y is received to the time that a timer for order Y expires. Thus, for example, matcher 110 may execute an instance of a matching process before step 216, during step 216, and/or after step 216. Accordingly, in certain examples, one or more instances of a matching process (e.g., for a given resource) may be executed by matcher 110 independently of the handling of new orders (such as order Y) and the subsequent processing for such orders that is performed in 216, 218, 220, 222, 223, and/or 224. Thus other orders may be matched against one another while other orders (like order Y) are pending, pre-pending, or otherwise not active or marketable.

Description of FIG. 3

FIG. 3 is another signal diagram that illustrates another example for receiving and processing an electronic data message between the components shown in FIG. 1 according to certain example embodiments.

At 300, order book 112 is populated with contra side orders (e.g., buy and sell orders). Some of the orders in the order book 112 may be active (e.g., marketable) and others may be listed as inactive (e.g., non-marketable). Pending list 114 may also be populated with active and/or inactive orders. Thus, in certain examples two separate lists (pre-pending and pending may be one list and executable and passive may be another list) may be used where each entry includes status flags to indicate, for example, if the order is marketable or not.

At 302, a new reference values(s) may be received via the incoming data feed. This new reference value may be, for example, an updated bid price for a given instrument, an updated ask price for a given instrument or have both updated bid and ask prices.

In response to reception of an updated reference value, the matcher 110 may determine if the midpoint of the two reference values (the bid and ask) has changed at 304. For example, when the best bid is 100 and the best offer is 101 the midpoint may be determined to be 100.5 (the midpoint between 100 and 101).

If there is no change in the midpoint value, then the process returns and waits for another update to the reference value. If, however, the midpoint value has changed from a previous midpoint value, then the matcher 110 performs a recalculation process on one or more orders in the order book and/or pending list (e.g., all of the orders in both the pending list and the order book). In certain examples, the NBBO may change, but the midpoint of the NBBO may not (e.g., if the NBBO is 100-101 and goes to 99-102, then the midpoint will be 100.5 in both cases).

As part of the recalculation process, the limit price of each order is compared against the calculated midpoint value in step 306. If the calculated midpoint price is within the limit value for the corresponding order, then the order is marked as active (e.g., by moving it from the passive list 708 to the executable list 706). If the calculated midpoint price is outside of the limit value for an order, then that order is marked as inactive (e.g., by moving the order from executable list 706 to the passive list 708). If there is no current timer for a newly active order on the pending list (e.g., those orders on the pre-pending and inactive "list"), then a new timer is started for that order at step 310.

In certain example embodiments, once a timer has started for an order that is on the pending list it does not stop even if that order becomes unmarketable (e.g., the current midpoint price is out of bounds for the limit for that order) before expiration of the timer. Instead, timers for previously marketable, but now non-marketable orders, will continue to count down. Indeed, in certain examples, the process of updating the active/inactive properties of the orders may skip those orders that have currently active timers. In certain examples, when the timer for that order expires the matcher 110 may determine if the order is marketable or unmarketable based on the last calculated midpoint price. If the order is unmarketable upon expiration of its timer, it will be moved to the order book 112 (or a list dedicated to inactive orders) where it will remain unmarketable until cancelation, modification (e.g., adjustment of the limit value for the order), or the reference value changes (or midpoint thereof).

In certain example embodiments, a timer that is active for an order may be reset or a timer may be restarted for an order. In certain examples, a timer may be reset if the order becomes not marketable during the timer countdown. For example, order A may be initially marketable and have its timer started (as described herein). Then while the timer for order A is counting down an order book state shifts to cause order A to now become not marketable. In such circumstances, the timer may be reset for Order A (e.g., which is on the pending list) upon determination that it has become newly non marketable. In certain examples, the reset may occur upon expiration of the timer when the marketable state of the order is checked again. Thus, for example, if order A became non-marketable during the timer, but by the time the timer expired was again marketable, the timer may not be reset. However, in certain examples, the timer may be reset under such circumstances. In certain example embodiments, if the state of the order is non-marketable upon expiration of the timer, then it may be reset and the timer restarted. In certain examples, upon an order becoming non-marketable, the timer may be paused. The timer may be restarted if the order becomes marketable again.

In certain examples, an order that is live (e.g., it already had a timer expire), may be returned to the pending list and have another timer started if that order becomes non-marketable. In certain examples, orders on the passive list (e.g., list 708 in FIG. 7A) may also be associated with timers in a manner similar to the pending list (704). In certain examples, the passive and pending lists may be combined to one list. Thus a list may be used to organize and keep track of those orders that are non-marketable and prevent orders from rapidly switching between executable (and marketable) and non-marketable.

In certain examples, the executable list 706 and/or the passive list 708 may be ordered by price and then time.

In certain example embodiments, if the timer for an order expires and that order is not-marketable (e.g., based on a comparison to the reference value), the order may stay on the pending list. Only when the order becomes marketable will it be moved from the pending list to the order book. Once in the order book, the order may stay in the order book and change between marketable and unmarketable based on changes to the midpoint.

At 312, once the active/inactive states of the orders in order book are updated, the matching process discussed in FIG. 4 is run on the revised state of the order book 112.

Description of FIG. 4

FIG. 4 is another signal diagram that illustrates how electronic data messages, or contents thereof, are matched against one another by the system shown in FIG. 1 according to certain example embodiments.

At 400, the matching process (e.g., an instance of the matching process) is performed. The matching process is performed between active orders (e.g., those on executable list 706). For example, a matching process may be performed between an active order that just had its pending timer expire and other, active contra-side orders in the order book 112. In another example, the matching process may be performed between active contra-side orders that are resting in the order book 112 (e.g., that is performed as a result of a reference value, such as the NBBO, changing). Further as discussed above, multiple instances of the matching process may be executed. Thus, for example, a first instance of the matching process may be executed where Order Y is not considered for that instant of the matching process (e.g., because it is still on the pending list). However, after the timer for order Y expires another instance of the matching process may be executed that takes order Y into account for that instance of the matching process (e.g., because order Y is now active and marketable).

In certain examples, a price at which two contra-side orders will match is the calculated midpoint price. In other examples, the price at which the match occurs is another price (e.g., a non-midpoint price). In certain examples, the price is at the best offer, the best bid, or some price between the best bid and best offer. In other examples, the price may be based on other types of reference data. For example, the net-asset-value (NAB) of a given asset may be used.

In certain examples, the matching process uses time priority. As the matcher 110 may only match midpoint orders, the "price" of those orders may not be relevant in the priority determination. Instead, the priority value may be based on the time that the order is "live" or the first instance that the order becomes marketable (e.g., the time when the timer is started for an order). In certain examples, the time aspect may be based on when the order was first activated on the pending list (e.g., when the timer was started) as opposed when the order was first accepted by the matcher 110. In other words, order A added to the pending list and marked as inactive will be placed behind (for purposes of priority in the matching process) order B, which was added to the pending list after order A, but as an active order. Order B was determined to be marketable before order A (even though order A was submitted before order B). In certain examples, priority uses the time of when the timer expires to determine priority (and thus is moved to the order book 112).

In other examples, the priority may be determined on a price/time basis. In certain examples, the "price" variable of the price/time calculation may be based on the limit value associated with the orders. Accordingly, orders with more aggressive limit values (e.g., higher in the case of bid orders or lower in the case of offer orders) may be sorted in the matching process ahead of orders with more conservative limit values.

In certain examples, priority may be based on other parameters. For example, priority may be pro rata, size pro rata, size/time, or the like.

The matching process may also have one or more of the following conditions for being executed: 1) a valid NBBO (e.g., a valid best bid and a valid best offer); 2) the instrument must be matchable (e.g. not halted for some reason); 3) the exchange must be within operational hours; 4) there must be a valid midpoint price for the instrument (e.g., between the NBBO); 5) the matcher 110 will only match against orders within the same order book (e.g., order book 112 may only include midpoint orders); 6) the order must satisfy minimum quantity requirements; 7) no crossed-market.

In certain example embodiments, matching between orders may be performed using a price/size pro rate technique. Other types of pro rata matching techniques may also be used during the matching process.

If no match is found for an order that just had its timer expire, then that order is placed into the order book 112. Also, if a match is found for one or more orders at 400, then any leftover size amount from one of the orders will be added to the order book 112.

At 402, the matcher 110 generates and sends an orders matched electronic data message via the command bus to the sequencer 106 indicating that a match has been found. The message may include the price at which the orders matched, the quantity of the match, the order IDs of the orders involved in the match, a flag that indicates if this was a "self-match," along with other information the sequencer needs in order to disseminate the trade details to downstream clients (e.g., order port module, outgoing data feed, etc. . . . ). In certain examples, the matcher 110 maintains its own internal sequencing process (e.g., similar or the same as the sequencing service used by the sequencer 106). Accordingly, matches identified by the matcher 110 may be stored, maintained, and reported to the sequencer 106 in a sequenced order. The sequencing of the identified matches may be used when a match is canceled by the sequencer 106.

At 404 the sequencer 106 validates the details of the matches against its own internal data store for the orders involved in the match. Part of the validation process may include validating that there is quantity available for the orders involved in the match (or that the order is still available). For example, client system two 102 may have submitted a cancel or modification request that was received by the sequencer 106 prior to the sequencer receiving the match found message from the matcher 110. If this occurs, then the sequencer may generate and send a responsive message (via the sequencer bus 109) indicating that the match was invalid or canceled (and thus did not really occur).

If a match is canceled by the sequencer 106, then all of the following matches that occurred after that canceled match may also be canceled because the following matches will now be out of sequence. Effectively the order book 112 for the matcher 110 will be rolled-back to a state prior to identification of the first of the canceled orders (but updated based on the new status of the order that caused the original cancelation). In other words, if order G was matched with order H by the matcher 110, but order G was canceled on the sequencer 106 before that match was executed, the matcher 110 will remove order G and rerun the matching process for the order book 112 with order H having been unmatched.

When the orders matched message includes a self-match flag, the sequencer may not validate and match the orders. Instead, the sequencer 106 may cancel both orders involved in the match and report back to the client systems (which may be the same or different client systems controlled by the same client) associated with the orders that this match did not occur because it was a self-match. Other types of processing may also occur in a self-match situation. For example, cancel the oldest of the two orders, cancel the newest of the orders, cancel all orders, or remove the quantity from the orders that were part of the self-match. In each of these scenarios, the client systems may be informed via the appropriate order port module 104.

If the found match is validated, then, at 406, the match is executed and the quantity from the respective orders is adjusted in the data store being managed by the sequencer 106.

At 407, the sequencer 106 publishes a message to the sequencer bus 109 indicating that the match has executed this message may be picked up by a backup sequencer and used by that component to mirror the execution on the backup sequencer. It also, at 408 and 414, publishes electronic data messages associated with the orders involved in the match (respectively, orders X and Y) to the sequencer bus 109. The messages (order execution messages) are picked up by client application processes (e.g., order port module 104, matcher 110, outgoing data feed 118, backup sequencer, etc. . . . ) that are listening to the sequencer bus 109.

At 410, the order port module 104 picks up the message regarding order X that was part of the executed match. Specifically, the order port module may determine that the order execution message on the sequencer bus 109 is for the client system (or the client account associated with that system) that communicates through a given order port. In response to reception of the order execution message, the order port module 104 transmits a message back to the corresponding client computer system for that order indicating that a match has been found and executed. This message may include match details (e.g. price, quantity, and other information) for the match.

At 412, the outgoing data feed 118 (e.g., ITCH) may receive the same message published to the sequencer bus 109 for order X that the order port module 104 is acting upon. Specifically, in response to the order execution message for order X, the outgoing data feed module 118 may publish a message to its outgoing data feed (e.g., via ITCH) that includes details of the just executed match. In certain examples, the details of the just executed match may include only the price at which the trade occurred and the quantity that was matched.

414 and 416 for order Y occur in a manner similar to 408 and 410 for order X.

Notably, the outgoing data feed 118 may only respond to one of the order execution messages. In certain examples, the message (e.g., of the multiple order executions that may be published by the matcher for a given match) that the outgoing data feed responds to may be the aggressing order, the offer order, the bid order, the order that was the adder, or the like.

Description of FIG. 5

FIG. 5 is a block diagram of an example computing device 500 (which may also be referred to, for example, as a "computing device," "computer system," or "computing system") according to some embodiments. In some embodiments, the computing device 500 includes one or more of the following: one or more processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the processors 502 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 5) that are included in, attached to, or otherwise in communication with the computing device 500, and that output data based on the received input data to the processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 5) such as, for example, a keyboard, mouse, trackpad, touchscreen, etc. . . . .

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc. . . . .

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively or additionally, in some embodiments, the computing device 500 includes one or more of: a processing system that includes the processors 502; a memory or storage system that includes the memory devices 504; and a network interface system that includes the network interface devices 506.

The computing device 500 may be arranged, in various embodiments, in many different ways. As just one example, the computing device 500 may be arranged such that the processors 502 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 500 may be arranged such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of exchange 100, order port module 104, sequencer 106, matcher 110, outgoing data feed module 118, incoming data feed module 116, post trade systems 120, client systems 102, each of which will be referred to individually for clarity as a "component" for the remainder of this paragraph, are implemented using an example of the computing device 500 of FIG. 5. In such embodiments, the following applies for each component: (a) the elements of the 500 computing device 500 shown in FIG. 5 (i.e., the one or more processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

The hardware configurations shown in FIG. 5 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 5, (e) via other hardware arrangements, architectures, and configurations, and/or via combinations of the technology described in (a) through (e).

Technical Advantages of Described Subject Matter

In certain example embodiments, data processing for electronic data messages is handled by different nodes of a distributed computer system. The distributed nature of the system allows certain processing to be offloaded to a matcher node that includes different lists for electronic data messages. This allows for new types of electronic data message processing to occur without slowing down the speed of sequencer node in the distributed system.

Selected Terminology

Whenever it is described in this document that a given item is present in "some embodiments," "various embodiments," "certain embodiments," "certain example embodiments," "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

ADDITIONAL APPLICATIONS OF DESCRIBED SUBJECT MATTER

Although process steps, algorithms or the like, including without limitation with reference to FIGS. 1-4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system comprising:
    a memory configured to store a data structure that includes a plurality of data transaction requests;
    a processing system comprising instructions that, when executed by at least one hardware processor including in the processing system, cause the at least one hardware processor to perform operations comprising:
        receiving a first data transaction request that includes a first value for a first parameter;
        delaying activating a timer for the first data transaction request until at least a first condition is satisfied;
        activating the timer for the first data transaction request based on satisfaction of the first condition;
        during a time period in which the timer for the first data transaction is not expired, performing a first instance of a matching process between at least two different data transaction requests, wherein the first instance of the matching process does not take into account at least the first data transaction request; and
        subsequent to expiration of the timer for the first data transaction request, performing a second instance of the matching process that takes into account the first data transaction request using a matching value that is a midpoint value between a pair of reference values, wherein subsequent to expiration of the timer for the first data transaction request the first data transaction request is associated with a second status.

2. The distributed computer system of claim 1, wherein the operations further comprise:
    obtaining at least one of the pair of reference values; and
    wherein satisfaction of the first condition includes having the first value of the first data transaction request satisfy the at least one of the pair of reference value.

3. The distributed computer system of claim 2, wherein the pair of reference values are based on or indicative of a current state of the data structure that includes at least two different types of data transaction requests.

4. The distributed computer system of claim 3, wherein the pair of reference values are further based on external data received from at least one external computer system.

5. The distributed computer system of claim 1, wherein the matching value for the first data transaction request is adjusted based on how the pair of reference values change over time.

6. The distributed computer system of claim 1, wherein the data structure includes a pre-pending list, a pending list, an executable list, and a passive list,
    wherein the first data transaction request is placed into the pre-pending list until the first condition is satisfied, wherein the first data transaction request is placed into the pending list while the timer is activated, wherein the first data transaction request is placed, after expiration of the timer, into the passive list in response to determination that the first value does not satisfy the first condition, wherein the matching process performs the matching process by taking in account those data transaction requests that are in the executable list.

7. The distributed computer system of claim 1, wherein the operations further comprise:

after activation of the timer for the first data transaction request and before expiration of the timer for the first data transaction request, adjusting the timer for the first data transaction request based on determination that the first value does not satisfy the first condition.

8. The distributed computer system of claim 7, wherein the operations further comprise:

resetting the timer and only restarting the timer upon determination that the first value satisfies the first condition;

pausing the timer until determination that the first value satisfies the first condition; and canceling the timer.

9. The distributed computer system of claim 1, wherein the first data transaction request is only included into an instance of the matching process based on complete expiration of the timer for the first data transaction request.

10. The distributed computer system of claim 1, wherein each one of a plurality of received data transaction requests is associated with a respective timer prior to being eligible to be included within an instance of the matching process, wherein different lengths of timers are used for different ones of the plurality of received data transaction requests.

11. The distributed computer system of claim 1, further comprising:

a plurality of computing nodes, which include at least one sequencer node and a plurality of matcher nodes, the sequencer node configured to sequence electronic data messages that are distributed across the distributed computer system, the matcher nodes configured to perform matching processes, wherein a first matcher node of the plurality of matcher nodes is configured to perform the matching process, and wherein each of the plurality of computing nodes comprise at least one hardware processor.

12. The distributed computer system of claim 11, wherein the first matcher node is configured to store a plurality of different data structures for each one of a plurality of different resource identifiers, wherein different matching processes are performed using each one of the plurality of different data structures for the first matcher node, wherein electronic data transaction requests for each of the plurality of different resources identifiers that have active timers are stored in the same data structure, wherein the matcher node is configured to, in response to expiration of a given timer for a corresponding electronic data transaction request, move the corresponding electronic data transaction request to a corresponding one of the plurality of different data structures that is associated with the resource identifier of the corresponding electronic data transaction request.

13. A method performed on a distributed computer system that includes memory, a transceiver, and at least one processor coupled to the memory and the transceiver, the method comprising:

storing a data structure that includes a plurality of data transaction requests;

receiving a first data transaction request that includes a first value for a first parameter;

delaying activating a timer for the first data transaction request until at least a first condition is satisfied;

activating the timer for the first data transaction request based on satisfaction of the first condition, wherein while the timer is active the first data transaction request is associated with a first status;

during a time period in which the timer for the first data transaction is not expired, performing a first instance of a matching process between at least two different data transaction requests, wherein the first instance of the matching process does not take into account at least the first data transaction request; and subsequent to expiration of the timer for the first data transaction request, performing a second instance of the matching process that takes into account the first data transaction request using a matching value that is a midpoint value between a pair of reference values, wherein subsequent to expiration of the timer for the first data transaction request the first data transaction request is associated with a second status.

14. The method of claim 13, further comprising:

obtaining at least one of the pair of reference values; and wherein satisfaction of the first condition includes having the first value of the first data transaction request satisfy the at least one of the pair of reference value.

15. The method of claim 13, wherein the matching value for the first data transaction request is adjusted based on how the pair of reference values change over time.

16. The method of claim 13, further comprising:

after activation of the timer for the first data transaction request and before expiration of the timer for the first data transaction request, adjusting the timer for the first data transaction request based on determination that the first value does not satisfy the first condition.

17. The method of claim 13, wherein each one of a plurality of received data transaction requests is associated with a respective timer prior to being eligible to be included within an instance of the matching process, wherein different lengths of timers are used for at least some of the plurality of received data transaction requests.

18. The method of claim 13, further comprising:

comparing the first value that is included with the first data transaction request to another value that is derived from at least some of the plurality of data transaction requests that are pending, wherein the first condition is based on comparing the first value.

19. A non-transitory computer readable storage medium storing computer executable instructions for use with a computer system that includes at least one processor, memory, and a transceiver, the memory configured to store a data structure that includes a plurality of data transaction requests, the stored computer executable instructions comprising instructions that cause the computer system to perform operations including:

receiving a first data transaction request that includes a first value for a first parameter;

delaying activating a timer for the first data transaction request until at least a first condition is satisfied;

activating the timer for the first data transaction request based on satisfaction of the first condition, wherein while the timer is active the first data transaction request is associated with a first status;

during a time period in which the timer for the first data transaction is not expired, performing a first instance of a matching process between at least two different data transaction requests, wherein the first instance of the matching process does not take into account at least the first data transaction request; and subsequent to expiration of the timer for the first data transaction request, performing a second instance of the matching process that takes into account the first data transaction request using a matching value that is a midpoint value between a pair of reference values, wherein subsequent to expiration of the timer for the first data transaction request the first data transaction request is associated with a second status.

20. The non-transitory computer readable storage medium of claim 19, wherein each one of a plurality of received data transaction requests is associated with a respective timer prior to being eligible to be included within an instance of the matching process, wherein different timer lengths are used for at least some of the plurality of received data transaction requests.

* * * * *